United States Patent
Zhang

(10) Patent No.: US 7,421,377 B2
(45) Date of Patent: Sep. 2, 2008

(54) METHOD AND APPARATUS FOR SUPRESSING NOISE IN A DOPPLER SYSTEM

(75) Inventor: Yu Zhang, Nanshan (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 0 days.

(21) Appl. No.: 11/607,447

(22) Filed: Nov. 30, 2006

(65) Prior Publication Data
US 2008/0059098 A1    Mar. 6, 2008

(30) Foreign Application Priority Data
Sep. 5, 2006     (CN) .................. 2006 1 0062498

(51) Int. Cl.
*G06F 15/00* (2006.01)

(52) U.S. Cl. ...................... 702/191; 702/195

(58) Field of Classification Search ................. 128/901; 342/84, 99, 171, 193, 418; 600/444, 445, 600/446, 457; 702/191, 195
See application file for complete search history.

(56) References Cited

U.S. PATENT DOCUMENTS

| | | | |
|---|---|---|---|
| 5,891,036 A | | 4/1999 | Izumi |
| 5,935,074 A | * | 8/1999 | Mo et al. .................... 600/454 |
| 6,251,077 B1 | * | 6/2001 | Mo et al. .................... 600/455 |
| 6,296,612 B1 | * | 10/2001 | Mo et al. .................... 600/455 |
| 6,577,967 B2 | * | 6/2003 | Mo et al. ....................... 702/76 |
| 2007/0016045 A1 | * | 1/2007 | Zhang ........................ 600/443 |

FOREIGN PATENT DOCUMENTS

| | | |
|---|---|---|
| CN | 1440726 A | 9/2003 |
| JP | 2001104308 A | 4/2001 |
| JP | 2003079626 A | 3/2003 |

OTHER PUBLICATIONS

"Doppler ultrasound signal denoising based on wavelet frames", IEEE, Trans Ultrason Ferroelectr Freq Contr, vol. 3 p. 709-716, 2001.*
"Denoising quadrature Doppler signals using the wavelet frame" see Ibid, vol. 5 p. 561-564, 2003.*
"Doppler ultrasound spectral enhancement using the Gabor transform based spectral subtraction", see Ibid, vol. 10 p. 1861-1.*

* cited by examiner

*Primary Examiner*—John E. Barlow
*Assistant Examiner*—Douglas N Washburn
(74) *Attorney, Agent, or Firm*—Kory D. Christensen; Stoel Rives LLP

(57) ABSTRACT

Present application provides a method for suppressing noise in a spectral Doppler system, comprising the steps of: obtaining a power spectrum of Doppler signals demodulated in the spectral Doppler system, by performing spectral analysis on the Doppler signals; estimating an average noise power of the spectral Doppler system; designing a noise suppression filter by determining its filter coefficients based on the power spectrum of the Doppler signals and the estimated average noise power; filtering the Doppler signals by using the designed noise suppression filter so as to reduce the noise.

32 Claims, 5 Drawing Sheets

METHOD AND APPARATUS FOR SUPRESSING NOISE IN A DOPPLER SYSTEM

RELATED APPLICATION DATA

This application claims priority to Chinese Application No. 200610062498.X filed on Sep. 5, 2006, the entire disclosure of which is incorporated herein by reference.

FIELD

The application relates to spectral Doppler technique, and more particularly to the method and apparatus for suppressing the noise in a spectral Doppler system.

BACKGROUND

Spectral Doppler technique is widely used in today's ultrasonic diagnostic system since it is especially suitable for the noninvasive detection and measurement of human body. For example, in a blood flow Doppler system, ultrasonic signals are transmitted into human body, then the echo signals scattered by the body tissue or blood flow are detected and analyzed so as to obtain a series of parameters, such as the velocity of blood, all of which are valuable for clinic diagnosis.

FIG. 1 is a block diagram of a typical ultrasonic Doppler system. As shown in FIG. 1, the received echo signals, as being weak, are generally amplified by a low noise amplifier, especially in a blood flow Doppler system. Then, the amplified echo signals are beam-formed and quadrature demodulated to obtain the quadrature Doppler signals. As for a blood flow Doppler system, the amplitude of the echo signals from the tissue or blood vessel wall is normally much higher than that from blood flow. For this reason, a high-pass filter (or known as wall filter) is needed to process the obtained quadrature Doppler signals after gap filling. In this way, most of the echo signals from the tissue and blood vessel wall, characterized in high amplitude and extremely low frequency, can be successfully cancelled.

As shown in FIG. 1, after high-pass filtering, the quadrature Doppler signals, in one path, are fed into a spectral analysis unit to calculate the spectrogram. Then, a parameter calculating unit extracts the mean frequency waveform, maximum frequency waveform and etc. based on the spectrogram, thereby producing some valuable parameters for clinic use. The spectrogram and the parameters, such as the maximum frequency waveform and etc., are then converted by a DSC (Digital Scan Converter) and sent to a monitor for real time display. In the other path, the filtered quadrature Doppler signals are fed into a direction separating unit, and then are separated into forward and backward blood flow Doppler signals. At last, the separated Doppler signals for forward and backward directions are converted by a DAC (digital-analog converter) and output to the right and left stereo speakers respectively. By using such a Doppler system, doctors can make more accurate diagnosis under the help of the spectrogram displayed in the monitor and the voice from the speaker.

In a practical system of FIG. 1, a large amount of noise is normally introduced into the Doppler signals by the amplifier when the echo signals are amplified. This kind of noise is generally regarded as white noise within the band of Doppler signals. As the detection depth increases, the amplitude of the scattered echo signals will be reduced, and thereby the amount of noise in the amplified echo signals will become obvious. As a result, the image quality of the spectrogram and the voice quality of the audio Doppler signals will be degraded significantly. However, it is difficult to remove the background noise introduced by the amplifier or other devices in the Doppler system, only through a simple high-pass or low-pass filter. This is because the spectral distribution of the obtained Doppler signals may be various in each scan. For voice signals, this will be more obvious as it is much more difficult to remove the background noise from the voice signals only through a simple high-pass or low-pass filter in the time domain.

To solve the above problem, Mo and etc. propose a method and apparatus for real-time noise reduction for Doppler audio output in U.S. Pat. No. 6,251,007. More specifically, the method comprises the following steps: performing FFT (Fast Fourier Transform) on the obtained Doppler signals to obtain a power spectrum; extracting the maximum frequency from the obtained power spectrum; setting a frequency as the cut-off frequency of a low-pass filter according to the maximum frequency; filtering the Doppler signals in frequency or time domain so as to reduce the noise. However, in this solution, the effect of noise reduction is highly dependent on the precision of the maximum frequency estimation. That is, when there is a wrong estimation of the maximum frequency, the voice output from the speaker will be distorted severely.

In addition, some other methods of noise reduction in Doppler system, are described in "Doppler ultrasound signal denoising based on wavelet frames", IEEE, *Trans Ultrason Ferroelectr Freq Contr*, Vol. 3 P709-716, 2001; "Denoising quadrature Doppler signals using the wavelet frame" see Ibid, Vol. 5 P561-564, 2003, and "Doppler ultrasound spectral enhancement using the Gabor transform based spectral subtraction", see Ibid, Vol. 10 P1861-1868, 2005. These methods are directed to reducing the background noise in time domain by using wavelet transform without subsampling, or by utilizing Gabor transform and Gabor expansion. But, these methods are not suitable to the practical applications for their high cost.

Therefore, there is still a need to provide a new method and apparatus capable of reducing the background noise in a Doppler system with high reliability and low cost.

SUMMARY

The present application provides a method for suppressing noise in a spectral Doppler system, comprising the steps of: obtaining a power spectrum of Doppler signals demodulated in the spectral Doppler system, by performing spectral analysis on the Doppler signals; estimating an average noise power of the spectral Doppler system; designing a noise suppression filter by determining its filter coefficients based on the power spectrum of the Doppler signals and the estimated average noise power; filtering the Doppler signals by using the designed noise suppression filter so as to reduce the noise.

The present application also provides a spectral Doppler system capable of suppressing noise therein, comprising: a spectral analysis unit configured to obtain a power spectrum of Doppler signals demodulated in the spectral Doppler system; an estimating unit configured to estimate an average noise power in the spectral Doppler system; a filter designing unit configured to determine filter coefficients of a noise suppression filter based on the power spectrum of the Doppler signals and the estimated average noise power; a filter formed by the filter coefficients output from the filter designing unit, for filtering the Doppler signals so as to reduce the noise therein.

BRIEF DESCRIPTION OF THE DRAWINGS

The appended claims are directed to some of the various embodiments. However, the detailed description presents a more complete understanding of embodiments when considered in connection with the figures, wherein like reference numbers refer to similar items throughout the figures and:

DETAILED DESCRIPTION

In the following detailed description, a blood flow Doppler system is taken as an example to describe the method and apparatus for suppressing noise according to the present embodiment, in connection with the appended drawings. However, those skilled in the art will understand that the method and apparatus for suppressing noise can also be used in other kind of ultrasonic Doppler systems, and moreover, can be realized in other applications such as laser Doppler systems.

Figure 1:
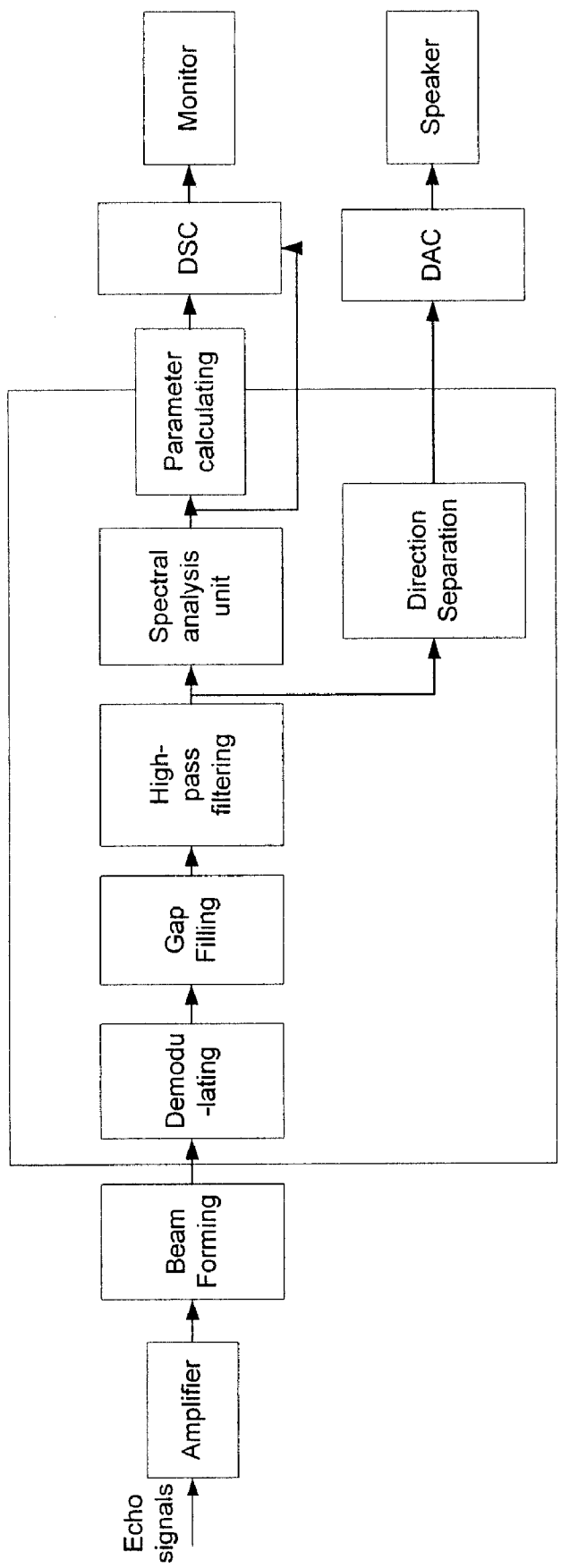
FIG. 1 is a block diagram of a traditional ultrasonic Doppler system.

In the blood flow Doppler system as shown in FIG. 1, the background noise is generally treated as Gaussian white noise, and the noise power is mainly determined by the front-end amplifier. In the same Doppler system, therefore, the power of the background noise will substantially keep unchanged at different time instants. Based on above, the inventor of present application proposes a new method to design a noise suppression filter based on the difference between a power spectrum of the obtained Doppler signals and an estimated average power of the background noise. By using this designing method, the characteristic of the filter can be updated together with the obtained power spectrum of Doppler signals, so that the background noise can be effectively reduced in real time.

Figure 2:
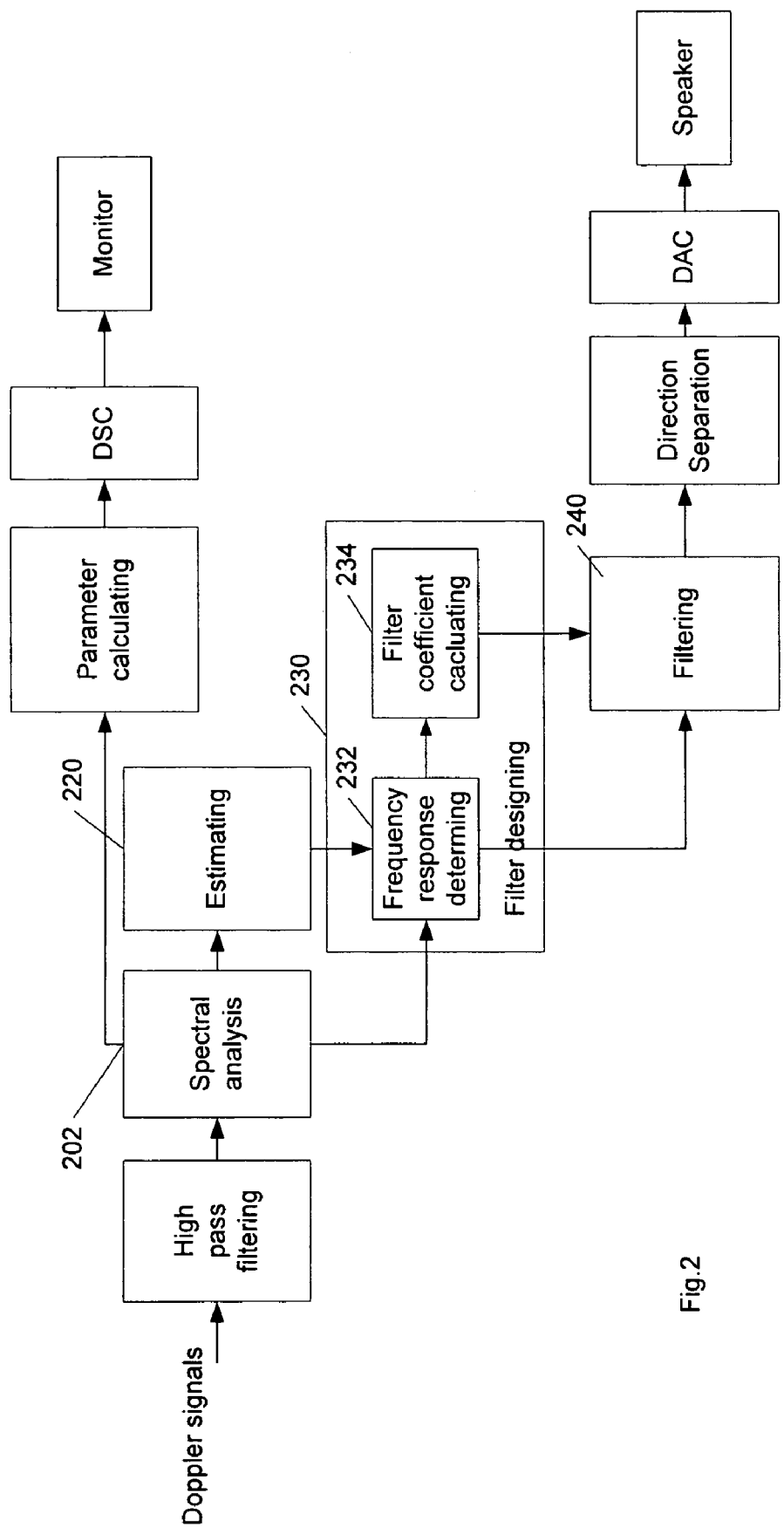
FIG. 2 is a block diagram of a spectral Doppler system in accordance with some embodiments.

FIG. 2 shows a blood flow Doppler system with noise suppression function according to some embodiments.

The blood flow Doppler system shown in FIG. 2 includes some components or units same as those in the traditional system of FIG. 1, and the detailed description on these same components is omitted here for simplicity.

Referring to FIG. 2, the demodulated quadrature Doppler signals are filtered by the high-pass filter to cancel the signals from the blood vessel walls. Then, the filtered Doppler signals are fed into a spectral analysis unit 202 to be processed with traditional FFT, so as to obtain the power spectrum of current quadrature Doppler signals. The spectral analysis unit can also be implemented by other spectral estimation methods, such as the auto-regressive method.

The blood flow Doppler system according to the embodiments further comprises an estimating unit 220, a filter designing unit 230 and a filtering unit 240, except for the same components as those in FIG. 1. The estimating unit 220 is used to estimate the average power of the background noise in the Doppler system. The filter designing unit 230, which further includes a frequency response determining unit 232 and a filter coefficients calculating unit 234, is configured to generate the filter coefficients of a noise suppression filter to be designed, based on the estimated average noise power and the output power spectrum from the spectral analysis unit 202. Filtering unit 240 then is formed from the filter coefficients output by the filter designing unit 230 to filter the quadrature Doppler signals, so as to remove or reduce the noise therein.

Figure 3:
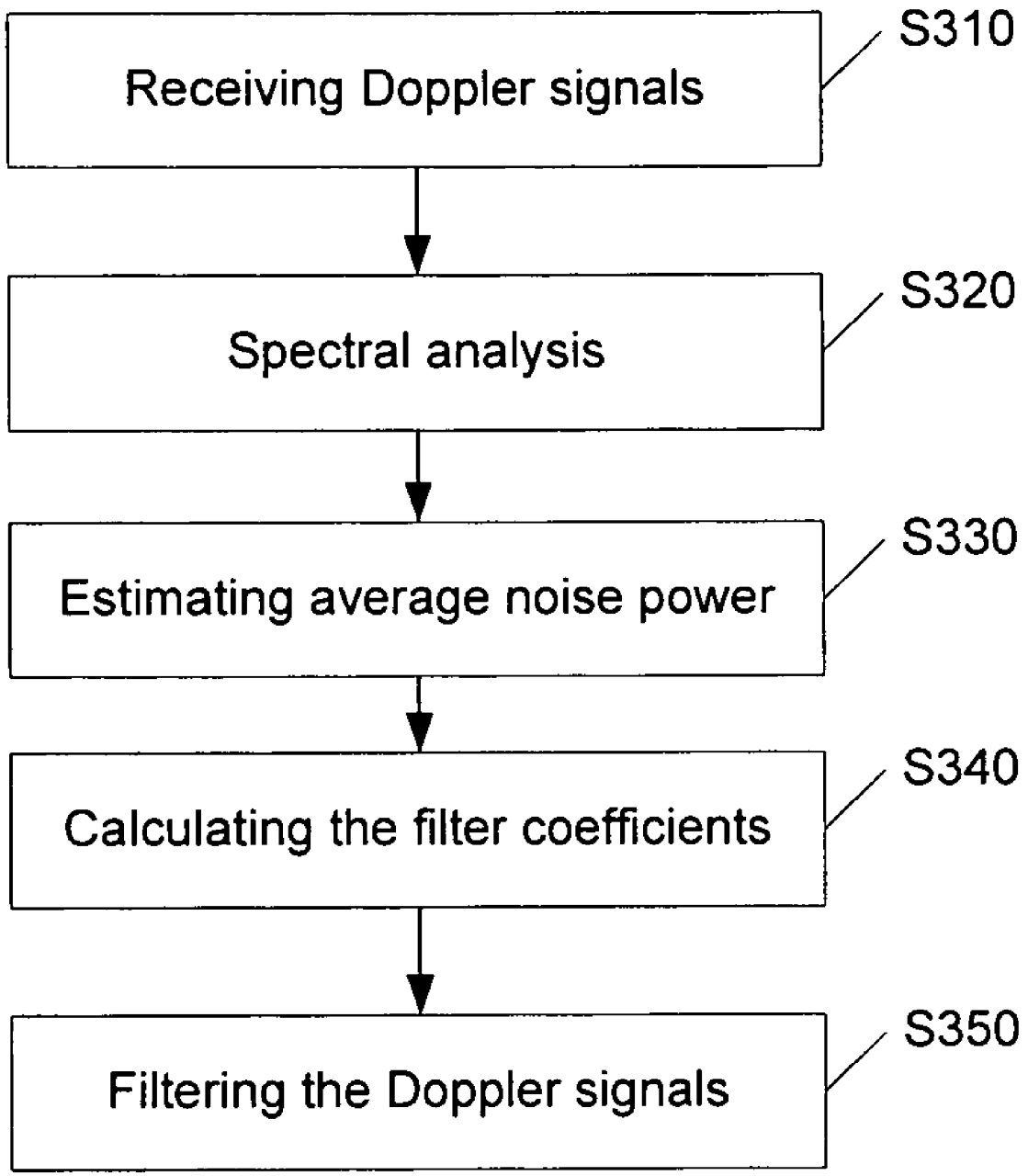
FIG. 3 is a flow chart illustrating the procedure for suppressing the noise in the spectral Doppler system in accordance with some embodiments.

FIG. 3 shows the detailed procedure of noise suppression in the blood flow Doppler system of FIG. 2. As shown in FIG. 3, the spectral analysis unit 202 first receives the demodulated quadrature Doppler signals (Step S310), and performs FFT operation on the received signals so as to obtain the power spectrum Px(f) of the quadrature Doppler signals (Step S320). In this embodiment, the Doppler signals received by the spectral analysis unit 202 are the demodulated Doppler signals after being gap filled and high-pass filtered. However, it is apparent for those skilled in the art that the Doppler signals input to the unit 202 can also be the signals output from the demodulation unit directly, or the signals being processed by other operations after demodulation. So, the present embodiment is not limited to this aspect. Alternatively, the signals input to the spectrum unit 202 can also be non-quadrature Doppler signals.

Next, the average power N of the background noise is estimated in the estimating unit 220 (step S330). The average noise power N can be obtained in various ways, such as by experimental measurement, on-line estimation and theoretical estimation. Several methods for estimating the average noise power N are given below as examples.

In step S330, the average noise power N may be obtained by the method of experimental measurement. That is, in advance, i.e. when no moving target is to be detected, the average power of the obtained Doppler signals is detected and can be regarded as the estimated average power N. This is because the Doppler signals do not carry any information about the movement of an object when there are only static targets and no moving objects, so that all of the obtained Doppler signals can be treated as the noise signals. This experimental measurement method can be realized in both pulsed wave and continuous wave Doppler systems.

For pulsed wave (PW) Doppler system, in the case that there is no moving object, the quadrature demodulated signals are integrated within a sampling gate. The integrated signals, besides a DC level resulting from the existed static object, can all be treated as the noise. Generally, these obtained noise signals are processed to achieve their power spectrum, and then the power spectrum is averaged to obtain the average noise power N thereof. As the length of integration is proportional to the length of the sampling gate, the average noise power N varies with the sampling gate that has different length. As a result, in clinic diagnosis, a sampling gate length is predetermined in advance as practically desired, then the Doppler signals obtained in the case of no moving target are integrated within the predetermined sampling gate, so as to obtain the average noise power N. In practical application, the Doppler system can further measure multiple average noise powers N under different sampling gate lengths in advance, so as to form a look-up table, and then the average noise power N for a current sampling gate length can be easily acquired by looking up the table.

For continuous wave (CW) Doppler system, in contrast, since the sampling gate and signals integration are not required, the Doppler signals can be detected directly in case that there is only static objects. Then, the power spectrum of the Doppler signals is averaged to obtain an average value, as the average noise power N.

Furthermore, the average noise power N may be also estimated by online estimation. It is well known that the maximum frequency of blood flow Doppler signals corresponds to the maximum speed of the detected blood flow, so that the frequency components greater than the maximum frequency all contribute to the noise. In addition, since the background noise of the system is treated as white noise, the noise power distribution within the whole band is uniform. Based on above two points, the inventor of present application proposes the online estimation method. More specifically, the method comprises the following steps: estimating the maximum frequency of the quadrature Doppler signals x(t) in real time; averaging the frequency components greater than the maximum frequency to obtain an average value as the average noise power N. Furthermore, in the spectrogram, the number of the noise frequency points may vary at different time instants and the number is relatively small, so the obtained estimation is random in some special case. Therefore, FIR (Finite Impulse Response) or IIR (Infinite Impulse Response) digital filter is required to smooth the average values obtained at different time instants. The smoothed average value may be used as a more precise average noise power N. In the above method, the maximum frequency in spectrogram may be estimated by a variety of well-known methods, such as Percentile method, Threshold-crossing method, geometric method, adaptive threshold method and etc.

Alternatively, the average noise power N may be obtained by other methods. For example, it may be calculated by theoretical estimation. But, the present embodiment is not limited to this aspect.

Generally the blood flow signals and noise signals are statistically independent. Therefore, after the average noise power N is estimated according to the above methods, the frequency response determining unit 232 in the filter designing unit 230 may determine the frequency response function H(f) for the noise suppression filter in frequency domain, based on the obtained power spectrum Px(f) and the average noise power N. Then, the frequency response function H(f) is transformed with IFFT (Inverse Fast Fourier Transform) by the filter coefficient calculating unit 234, so as to obtain the filter coefficients h(n) in time domain (step S340).

Wherein, the filter frequency response function H(f) may be obtained with reference to the designing procedure of Wiener filter. In the design of Wiener filter, the frequency response function H(f) of Wiener filter may be defined as:

$$H(f) = \frac{Ps(f)}{Px(f)} \quad (1)$$

Where, Ps(f) is the power spectrum of the noise-free quadrature Doppler signals; Px(f) is power spectrum of the noisy quadrature Doppler signals. For the stochastic signals of an unknown system, generally Ps(f) can not be solved theoretically. But, when there is only white noise in the system, the signals power spectrum Ps(f) may be estimated based on the average noise power N, as below:

$$Ps(f) = Px(f) - N \quad (2)$$

Wherein, N is the estimated average noise power.

If the Ps(f) in the equation (1) is substituted by equation (2), a simple H(f) for the noise suppression filter may be obtained.

In an embodiment, the frequency response function H(f) for the noise suppression filter is defined as:

$$H(f) = \frac{\max\{Px(f) - kN, Th(f)\}}{Px(f)} \quad (3)$$

Where, k is a preset constant and Th(f) is a predetermined threshold.

Constant k is used to adjust the degree of noise suppression. It is generally greater than 1, i.e. the greater k, the more noise suppression, but more signals will be lost in this case. Therefore, k may be preset according to the signal to noise ratio (SNR) in a practical application. If SNR is large, k may be relatively big. If SNR is small, k may have a smaller value. In this embodiment, k has the value of about 3, which is generally sufficient to meet the requirement of practical applications.

Th(f) is a preset threshold. As shown in equation (2), if Px(f)–kN is less than the preset threshold, frequency response function H(f) will be Th(f)/Px(f), otherwise, H(f)=1–kN/Px(f). For simplicity, the threshold Th(f) may be defined as:

$$Th(f) = k'Px(f) \quad (4)$$

Where, k' is a preset constant which is greater than 0 and less than 1. This constant can adjust the proportion between the threshold Th(f) and the power spectrum Px(f) of Doppler signals. By combining the equations (4) and (3), the H(f) is obtained as:

$$H(f) = \max\left\{\frac{Px(f) - kN}{Px(f)}, k'\right\} \quad (5)$$

Figure 4:
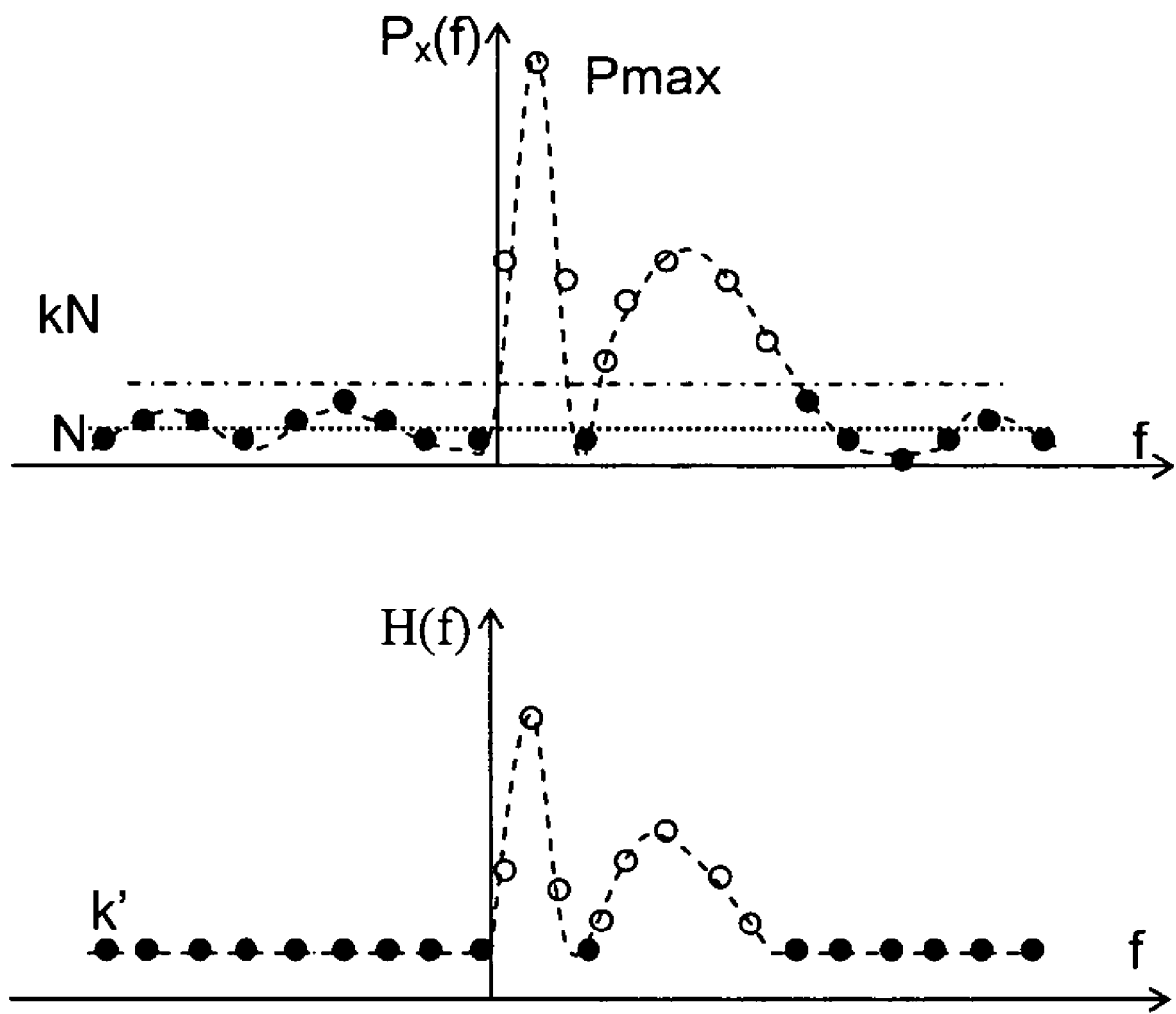
FIG. 4 illustrates a frequency response function of a noise suppression filter according to some embodiments.

From equation (5), it can be seen that when the power spectrum Px(f) is much greater than the average noise power N, the filter frequency response function H(f) is close to 1. In other word, if the amplitude of Doppler signals is very high, the noise in the Doppler signals may be ignored. At this time, the obtained Doppler signals may pass the filter without any suppression and any distortion in amplitude. If the power spectrum Px(f) of the Doppler signals is comparable with the average noise power N, H(f) will be equal to k' or a small number close to k'. Here, Doppler signals are attenuated by the filter. Therefore, the resulting value of H(f) is in the range of [k', 1]. FIG. 4 shows the power spectrum Px(f) of Doppler signals and the filter frequency response function H(f); which is calculated from the power spectrum Px(f) and the average noise power N according to equation (5).

After frequency response determining unit 232 has determined H(f), filter coefficient calculating unit 234 performs IFFT on the determined H(f) to obtain the filter coefficient h(n) in time domain. At this time, complex coefficients of a FIR filter are obtained and the number of taps of the obtained filter equals to the length of the power spectrum (in traditional Doppler system, there are 256 frequency points in the power spectrum). Thus, if the filter is directly used to filter the Doppler signals, a large amount of calculations are needed. Meanwhile, when there are less data in each scan for spectrum updating, the transient response in FIR filter will adversely affect the noise suppression. In order to reduce above influence, the method may also comprises performing down-sampling on the frequency response function H(f) of the obtained filter. For example, the coefficients for a FIR filter with 64 points are obtained by 4 times down-sampling. It is approved by experiments that the filter with this length is suitable without causing any undesirable effect on the noise suppression, and the interference introduced by transient response may also be ignored. Therefore, filter coefficient calculating unit 234 may also set a sampling rate in advance, so as to perform down-sampling on the determined H(f). Then, the down-sampled H(f) is transformed with IFFT, so as to obtain the filter coefficients h(n) in time domain.

At last, the filter coefficient calculating unit 234 will output the calculated filter coefficients h(n) to the filtering unit 240. Then, the filtering unit 240 generates a noise suppression filter based on the filter coefficients h(n), to cancel the noise in the Doppler signals (step S350).

By using the method of in FIG. 3, the ultrasonic Doppler system according to one embodiment may obtain complex coefficients of a FIR filter based on the power spectrum Px(f) of Doppler signals and the estimated average noise power N. Then, the quadrature Doppler signals are filtered by the filter generated from the complex filter coefficients, so as to remove or reduce the noise in Doppler signals. In present embodiment, the filter coefficients are updated every time the power spectrum of Doppler signal is calculated in the spectral analysis unit. Therefore, the filter is adaptively adjusted according to the spectral distribution and the amplitude of current Doppler signals, thereby effectively suppressing the background noise in the Doppler signals.

Figure 5:
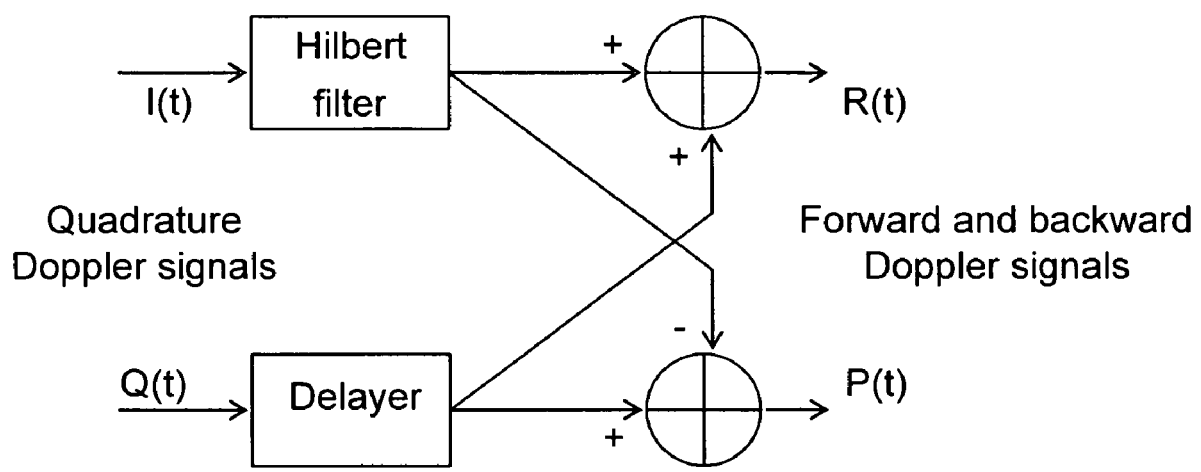
FIG. 5 shows the structure of the direction separating unit of the FIG. 2.

As shown in FIG. 2, the Doppler signals filtered by the filtering unit 240 may further be fed into the direction separation unit to be separated into forward and backward Doppler signals. The separated Doppler signals are then sent to the right and left stereo speakers respectively, so as to playback the audio Doppler signals with extremely low noise. The direction separation unit may utilize the traditional Hilbert filter to separate the Doppler signals, as shown in FIG. 5. The Hilbert filter is well known to those skilled in the art, so detailed description thereof is omitted.

Moreover, the filtered Doppler signals may be processed by the spectral analysis unit and the parameter calculating unit again, to obtain the optimized spectrogram with little or no noise.

An embodiment of a noise suppression filter with complex filter coefficients is described as above in connection with the drawings. Alternatively, the filter coefficients h(n) of the noise suppression filter may also be real values. In this embodiment, Doppler signals are first separated by the direction separation unit, and then the noise suppression filter may directly filter the separated forward and backward Doppler signals. In detail, the filter coefficient calculating unit 234 performs IFFT on the positive and negative frequency components respectively, so as to obtain the filter coefficients for two filters, Then, the real part is taken from the complex coefficients, so that two set of real filter coefficients are obtained. The filtering unit 240 may correspondingly form two noise suppression filters to filter the forward and backward Doppler real signals respectively, and then send the filtered signals to the speaker.

It is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method for suppressing noise in a spectral Doppler system, comprising the steps of:
 obtaining a power spectrum of Doppler signals demodulated in the spectral Doppler system, by performing spectral analysis on the Doppler signals;
 estimating an average noise power of a background noise in the spectral Doppler system;
 designing a noise suppression filter by determining its filter coefficients based on the power spectrum of the Doppler signals and the estimated average noise power;
 filtering the Doppler signals by using the designed noise suppression filter so as to reduce the background noise.

2. The method of claim 1,
 wherein the frequency response of the filter is a function of the power spectrum of noise-free Doppler signals Ps(f), and $$Ps(f)=Px(f)-kN$$

where Px(f) is the power spectrum of noisy Doppler signals;
 N is the estimated average noise power; and
 k is a preset constant greater than 1.

3. The method of claim 2, wherein the frequency response H(f) is defined as:

$$H(f) = \frac{\max\{Px(f) - kN, Th(f)\}}{Px(f)}$$

where Px(f) is the power spectrum of the noisy Doppler signals;
 N is the estimated average noise power;
 k is a preset constant greater than 1; and
 Th(f) is a preset threshold.

4. The method of claim 2, wherein the step of designing the noise suppression filter further comprises:
 down-sampling the frequency response of the noise suppression filter;
 obtaining the filter coefficients based on the down-sampled frequency response.

5. The method of claim 1, wherein the filter coefficients are updated every time the spectrum analysis is performed on the Doppler signals.

6. The method of claim 1, wherein, when the spectral Doppler system is continuous wave Doppler system, the step of estimating the average noise power comprises:
 calculating a power spectrum of the obtained Doppler signals when no moving target is to be detected;
 averaging the calculated power spectrum of the Doppler signals to obtain the average noise power.

7. The method of claim 1, wherein, when the spectral Doppler system is pulsed wave Doppler system, the step of estimating the average noise power comprises:
 calculating a power spectrum of the obtained Doppler signals according to a sampling gate with a predefined length, when no moving target is to be detected;
 averaging the calculated power spectrum of the Doppler signals to obtain the average noise power.

8. The method of claim 1, wherein the step of estimating the average noise power comprises:
 determining the maximum frequency of the Doppler signals based on the power spectrum of the Doppler signals;
 averaging frequency components greater than the maximum frequency in the power spectrum to obtain an averaged value, as the average noise power.

9. The method of claim 8, wherein:
 the step of determining the maximum frequency of the Doppler signals and the step of averaging are performed repeatedly at different time instants, so as to obtain a plurality of the averaged values, and
 smoothing the plurality of the averaged values to obtain the average noise power.

10. The method of claim 9, wherein the maximum frequency of the Doppler signals is determined through one of the percentile method, the threshold-crossing method, the geometric method and the adaptive threshold method.

11. The method of claim 1, wherein the Doppler signals are quadrature Doppler signals, and the method further comprises:
separating the filtered quadrature Doppler signals into forward and backward Doppler signals.

12. The method of claim 2, wherein the Doppler signals are quadrature Doppler signals, and the step of obtaining the power spectrum of the Doppler signals further comprises:
separating the quadrature Doppler signals into forward and backward Doppler signals; and
the step of designing the noise suppression filter further comprises:
determining the filter coefficients for two noise suppression filters based on positive and negative frequency components of the determined frequency response, so as to design two noise suppression filters for filtering the forward and backward Doppler signals respectively.

13. A spectral Doppler system capable of suppressing noise therein, comprising:
a spectral analysis unit configured to obtain a power spectrum of Doppler signals demodulated in the spectral Doppler system;
an estimating unit configured to estimate an average noise power of a background noise in the spectral Doppler system;
a filter designing unit configured to determine filter coefficients of a noise suppression filter based on the power spectrum of the Doppler signals and the estimated average noise power;
the noise suppression filter formed by the filter coefficients output from the filter designing unit, for filtering the Doppler signals so as to reduce the background noise therein.

14. The system of claim 13,
wherein the frequency response of the filter is a function of the power spectrum of noise-free Doppler signals $Ps(f)$, and $Ps(f)=Px(f)-kN$ where $Px(f)$ is the power spectrum of noisy Doppler signals;
N is the estimated average noise power; and
k is a preset constant greater than 1.

15. The system of claim 14, wherein the frequency response $H(f)$ is defined as:

$$H(f) = \frac{\max\{Px(f) - kN, Th(f)\}}{Px(f)}.$$

Where, $Px(f)$ is the power spectrum of the noisy Doppler signals;
N is the average noise power;
k is a preset constant greater than 1; and
$Th(f)$ is a preset threshold.

16. The system of claim 13, wherein the filter coefficients are updated every time spectrum analysis is performed on the Doppler signals.

17. The system of claim 13, wherein, when the spectral Doppler system is a continuous Doppler system, the estimating unit comprises:

an averaging unit, configured to average the calculated power spectrum of the Doppler signals when no moving target is to be detected, so as to obtain the average noise power.

18. The system of claim 13, wherein, when the spectral Doppler system is a pulse wave modulation, the estimating unit comprises:
an averaging unit, configured to average the calculated power spectrum of the Doppler signals according to a sample gate with a predetermined length, when no moving target is to be detected, so as to obtain the average noise power.

19. The system of claim 13, wherein the estimating unit comprises:
a maximum frequency determining unit, configured to determine the maximum frequency of the Doppler signals based on the power spectrum of thereof;
an averaging unit, configured to average frequency components greater than the maximum frequency of the Doppler signals in the power spectrum thereof, so as to obtain the averaged value as the average noise power.

20. The system of claim 19, wherein the maximum frequency determining unit and the averaging unit are repeatedly operated at different time instants, to obtain a plurality of averaged values; and the estimating unit further comprises:
a smoothing unit, configured to smooth the plurality of the averaged value to obtain the average noise power.

21. The system of claim 13, wherein the Doppler signals are quadrature Doppler signals, and the system further comprises:
a direction separating unit, configured to separate the filtered quadrature Doppler signals into forward and backward Doppler signals.

22. The system of claim 14, wherein, when the Doppler signals are quadrature Doppler signals, the spectral analysis unit further comprises:
a direction separating unit, configured to separate the quadrature Doppler signals into forward and backward Doppler signals; and
the designing unit, further configured to determine filter coefficients for two noise suppression filters based on positive and negative frequency components of the determined frequency response, so as to filter the forward and backward Doppler signals respectively.

23. A machine-readable medium that provides instructions, which when executed by a processor in a spectral Doppler system, cause the processor to perform operations comprising:
obtaining a power spectrum of Doppler signals demodulated in the spectral Doppler system, by performing spectrum analysis on the Doppler signals;
estimating an average noise power of a background noise in the spectral Doppler system;
designing a noise suppression filter by determining its filter coefficients based on the power spectrum of the Doppler signals and the estimated average noise power;
filtering the Doppler signals by using the designed noise suppression filter so as to reduce the background noise.

24. The method of claim 1, wherein the average noise power of the spectral Doppler system is estimated using high pass filtered signals.

25. The method of claim 1, wherein the background noise comprises a background noise of an entire band in the spectral Doppler system.

26. The method of claim 1, wherein the filter coefficients are determined by obtaining a frequency response of the noise suppression filter.

27. The system of claim 13, wherein the estimating unit is configured to estimate the average noise power of the background noise using high pass filtered signals.

28. The system of claim 13, wherein the background noise comprises a background noise of an entire band in the spectral Doppler system.

29. The system of claim 13, wherein the filter designing unit is configured to determine the filter coefficients by obtaining a frequency response of the noise suppression filter.

30. The machine-readable medium of claim 23, wherein the average noise power of the spectral Doppler system is estimated using high pass filtered signals.

31. The machine-readable medium of claim 23, wherein the background noise comprises a background noise of an entire band in the spectral Doppler system.

32. The machine-readable medium of claim 23, wherein the filter coefficients are determined by obtaining a frequency response of the noise suppression filter.

* * * * *